United States Patent [19]

Bago

[11] Patent Number: 4,572,133
[45] Date of Patent: Feb. 25, 1986

[54] HIGH COMPRESSION RATIO AND EFFICIENCY GOVERNED SELF-IGNITION INTERNAL COMBUSTION ENGINE

[76] Inventor: Julius Bago, Star Rte. #3, Wurtsboro, N.Y. 12790

[21] Appl. No.: 684,647

[22] Filed: Dec. 21, 1984

Related U.S. Application Data

[63] Continuation-in-part of Ser. No. 435,966, Oct. 22, 1982, abandoned.

[51] Int. Cl.$^4$ ............................................. F02B 3/00
[52] U.S. Cl. .................................. 123/431; 123/294; 123/280; 123/557
[58] Field of Search ............... 123/280, 557, 525, 294, 123/431

[56] References Cited

U.S. PATENT DOCUMENTS

| | | | |
|---|---|---|---|
| 1,121,135 | 12/1914 | Schmid | 123/431 |
| 1,214,937 | 2/1917 | Mensfordh | 123/431 |
| 2,534,346 | 12/1950 | Fenney | 123/431 |
| 2,695,011 | 11/1954 | Dodds et al. | 123/431 |
| 2,701,133 | 2/1955 | Mendóz | 123/557 |
| 2,950,707 | 8/1960 | Butler | 123/294 |
| 3,077,189 | 2/1963 | Earnshaw et al. | 123/294 |
| 3,439,656 | 4/1969 | Hidey | 123/431 |
| 3,765,382 | 10/1973 | Vandenberg | 123/557 |
| 3,895,618 | 7/1975 | Cerf | 123/431 |
| 4,019,473 | 4/1977 | Kamiya | 123/280 |
| 4,048,969 | 9/1977 | Widman | 123/557 |
| 4,084,551 | 4/1978 | Noguchi et al. | |
| 4,193,379 | 3/1980 | Dietrich et al. | 123/280 |
| 4,325,345 | 4/1982 | Wilkinson et al. | 123/557 |
| 4,347,824 | 9/1982 | Pierson | 123/527 |
| 4,349,001 | 9/1982 | Wagner | |
| 4,372,280 | 2/1983 | Adams | 123/557 |

Primary Examiner—Raymond A. Nelli
Attorney, Agent, or Firm—Pennie & Edmonds

[57] ABSTRACT

A high compression ratio internal combustion engine operable on a fuel capable of being pressurized and vaporized to pressures above atmospheric pressure and having dual fuel introduction means respectively communicating with dual fuel sources. The first fuel introduction means is a low pressure fuel supply means by which fuel is introduced into the engine at low pressure in a fuel/air ratio mixture lower than which supports self-ignition under the temperatures generated by the compression thereof within the combustion chamber of the engine. A secondary—or auxiliary—fuel supply is provided and is capable of introducing predetermined amounts of only fuel in an atomized state and at elevated pressures greater than the pressure developed on the compression stroke within the combustion chamber. This secondary fuel is introduced into the combustion chamber at elevated pressure—and depending upon the fuel—at elevated temperature, and in amounts sufficient to raise the effective fuel/air ratio within the combustion chamber sufficient to support the self-ignition therein by the elevated temperatures which are compression generated within the combustion chamber.

19 Claims, 2 Drawing Figures ized state in the cylinders. Diesel-type engines
HIGH COMPRESSION RATIO AND EFFICIENCY GOVERNED SELF-IGNITION INTERNAL COMBUSTION ENGINE This application is a continuation-in-part of application Ser. No. 435,966, filed Oct. 22, 1982 now abandoned.

BACKGROUND OF THE INVENTION

1. Field of the Invention

This invention relates to high compression governed self-ignition internal combustion engines.

2. Description of the Related Art

Presently known internal combustion engines are generally provided with spark ignition for purposes of igniting combustible mixtures of fuel and air while in a compressed state in the cylinders. Diesel-type engines are provided with higher compression ratio cylinders and pistons which draw air into the cylinder and thereafter, compress the air to a significantly higher compression ratio than the standard spark ignited gasoline engine. As a result of this high compression, the air in the cylinder is heated to a temperature higher than the ignition temperature of the diesel fuel. At a predetermined point in time during the piston cycle the diesel fuel is introduced into the cylinder and the compression of the air and the high temperature causes ignition and burning of the fuel.

Both the standard spark ignited gasoline engine and the diesel engine suffer from a number of well-known disadvantages. Firstly, the spark ignited gasoline engine does not normally provide complete, or nearly complete, burning of the fuel in the cylinders so that the energy delivered by the engine is a much lower percentage than that of which it would be capable if more complete burning took place. The diesel engine, on the other hand, is operable at a higher compression ratio than the gasoline engine but the mixture residence time of the diesel fuel and the air in the cylinder space above the piston is less than the mixture residence time of the gasoline engine. Accordingly, the economical operation and efficiency of diesel engines depends largely on the quality of vaporization of the fuel and there is no precise control point at which time burning will take place. Specifically, control of the ignition point in a diesel engine is difficult to maintain throughout the speed range of the engine with the result that at lower speeds the lack of precise ignition timing causes a periodic engine knocking noise, while at higher speeds the diesel engine is incapable of increasing its power output after a predetermined level. I have invented an engine which utilizes a dual fuel introduction system to control self-ignition and which operates at higher efficiency and avoids the disadvantages of both the spark ignited gasoline engine and the diesel engine.

SUMMARY OF THE INVENTION

An internal combustion engine operable on a fuel capable of being atomized at pressures above atmospheric pressure, which comprises at least one piston and cylinder defining an internal combustion chamber of compression ratio sufficient to provide self-ignition with said fuel when mixed therein with air, an intake manifold selectively communicating a first source of said fuel with said internal combustion chamber by intake means operable in governed relation to piston stroke and position, exhaust means governed according to piston position and operable to selectively permit combusted gases to exit the cylinder, means for selectively mixing fuel from said first fuel supply with air at relatively low pressure and for permitting said mixture to be introduced into said cylinder through said intake means during the intake stroke of the piston, the fuel/air ratio being less than the ratio required for self-ignition when the piston is at the top of the compression stroke, auxiliary fuel supply means maintained at a predetermined pressure, the pressure being greater than the pressure within the combustion chamber when the piston is at or near top dead center, and valve means for selectively communicating said auxiliary fuel supply means with said combustion chamber and for selectively permitting a predetermined amount of said fuel under pressure to be introduced from said auxiliary fuel supply means into said combustion chamber in timed sequence such that when said piston is at a predetermined position at or near the top of the compression stroke of said piston, a predetermined amount of auxiliary fuel is permitted to be introduced into said combustion chamber sufficient to raise the fuel/air ratio therein to a level sufficient to cause governed self-ignition within said combustion chamber at the temperature caused by the compression of said first supply of fuel and air therein, whereby said first fuel and air mixture and residence time in said chamber and said auxiliary pressurized fuel supply results in substantial burning efficiency of the fuel and air therein thereby resulting in substantially improved efficiency of the energy output of said engine.

By precisely timing the introduction of this secondary fuel, the point in time and piston position at which self-ignition takes place is thereby carefully controlled—or in other words, governed.

DESCRIPTION OF THE PREFERRED EMBODIMENTS

The engine of the present invention is constructed and designed in order to produce much more energy from fuels such as Liquid Petroleum gas (LP gas), gasoline, kerosene, propane gas, natural gas, etc., while reducing fuel consumption over those engines which operate on presently known principles. In particular, such an effect is obtained by constructing such a strong engine-body that it can resist 150 percent greater explosive force than than the engine-bodies built up until now. In order not to have pernicious self-ignition prematurely from this high compression the present invention is designed to operate on a new principle of fuel-input which is divided into two parts; in this new system the fuel-input is accomplished in two different ways, with two different pressures, with two different quantities of fuel and within two different points of times. If we use LP gas for example, we set up a gas-mixer in a carburetor of known type in which we fit in the mixture-throttle, a ball-shaped gas-mixer with tiny holes and an adjustable needle-valve. The control arm of the needle valve is connected with the regulating-lever of the mixture-throttle in order to regulate the quantity of gas and air led in the gas-mixer together with the needle-valve and mixture-throttle in accordance with the desired output of the engine. In this way we feed only the low-pressure gas and the quantity of it should not be more than about 10 percent of the air taken into the cylinder, because this quantity is insufficient to support combustion or self-ignition. Self-ignition requires that the quantity of fuel be at least about 16.5 percent. In order to feed this still missing 6.5 percent quantity of fuel in by high-pressure techniques into the condensed combustion space on the compression stroke, in a preferred embodiment we utilize a combination of a gas heater with LP gas compressor and an electrical preheater which creates high-pressure gas and maintains the high pressure continuously during starting and during normal operation.

An auxiliary gas container is provided being an entirely closed, strong, tubular entity with double walls which consists of a heater and a preheater. For steady operation we lead the necessary quantity of heat from the exhaust pipe of the engine into the space existing between the double walls of the gas container. The heat is regulated by a thermostat and a mixture throttle in order to keep the gas in the container at a uniform temperature to fit the required atmospheric pressures during running. All of the above are necessary for starting of engine. During starting an electrically operated preheater filament is used. The thermostat disconnects the filament after starting the engine because initially on starting, the gas container gets little quantity of heat through a side pipe from the heat of the exhauster. This is regulated by the thermostat and mixture throttle. The high pressure gas-regulating valve is mounted in the top level of the heater.

Figure 1:
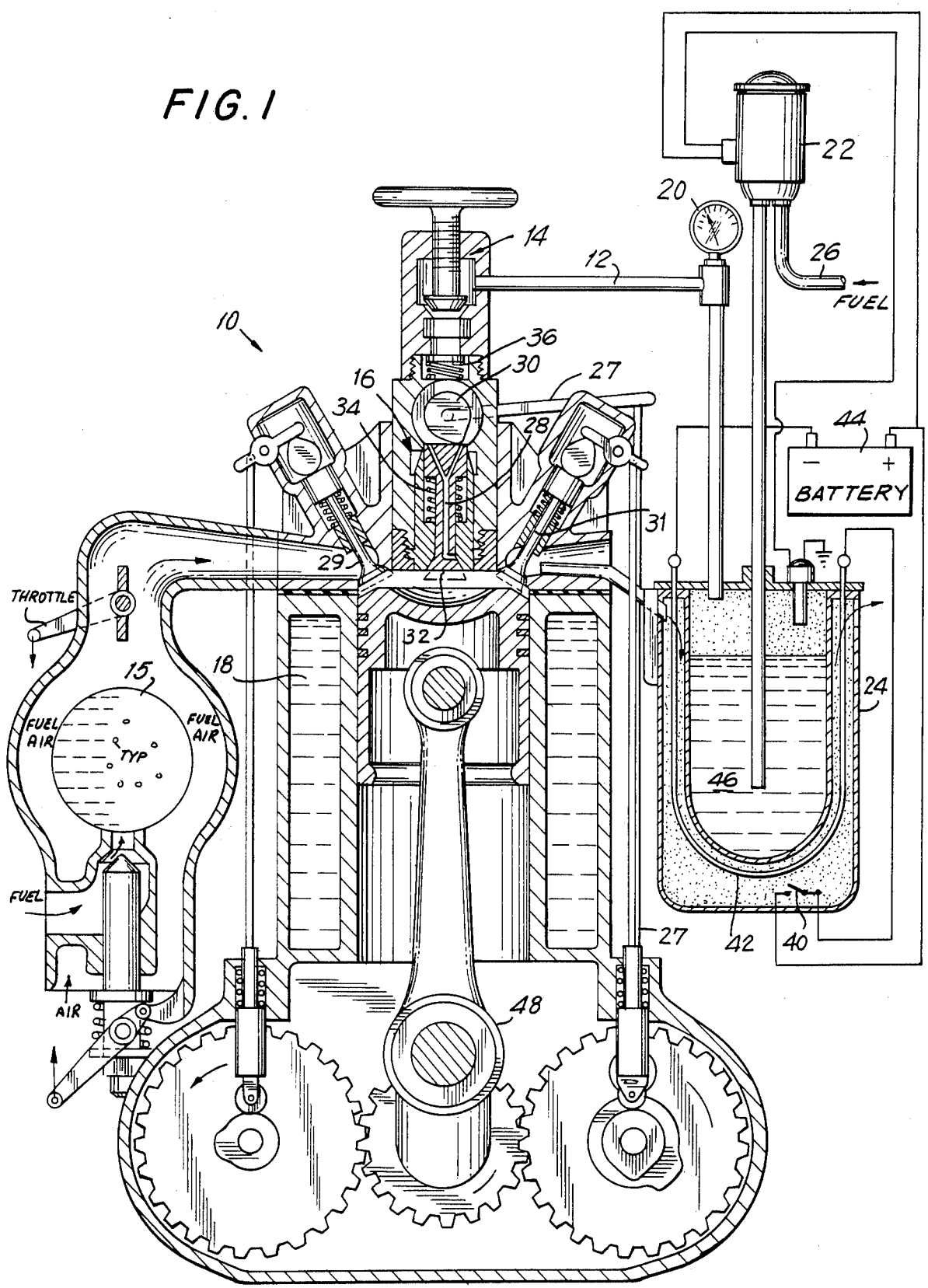
FIG. 1 is a cross-sectional view of a typical cylinder and piston of an engine constructed according to the invention.

Referring now to FIG. 1, there is shown in cross-section, an illustrative example of an engine constructed in accordance with my invention. This embodiment, shown in FIG. 1 is intended for use with LP gas, which must be heated to become pressurized. Also, propane, natural gas or other fuels which require heating to develop pressure may be used. The engine shown has a compression ratio of from about 10:1 to about 25:1, preferably about 18:1. The pipe 12 of LP gas-regulating main valve 14 joins the high-pressure gas-feeding valve mechanism 16 which is fitted at top dead center of the cylinder-head 18 of engine 10. Gas-pressure gauge 20 and the LP gas compressor 22 joins the pressurized and auxiliary gas tank 24 through the low-pressure gas pipe 26 to the main gas supply tank (not shown). The gas is pumped into the auxiliary tank 24 through the gas compressor and is heated to the necessary temperature continuously in order to create high pressure vapor of the LP gas. The gas led in the inside of the auxiliary tank, increases to 20–22 atmospheres pressure by the effect of the heat in the hollow walled tank 24. When the pressure in the auxiliary tank exceeds the preset limit the pressure cut-off switch 38 disconnects electrical power to gas compressor 22. The LP gas with this pressure moves in vaporized form with great intensity into the combustion space of cylinder head 18 through the high pressure steering and feeding valve mechanism 16 fixed to the cylinder head and it meets the fuel taken into the cylinder 18 in advance with only 10 percent fuel/air ratio. In this manner the mixture of air and fuel with high compression i.e. now 16.5 percent fuel/air, which is necessary to accomplish spontaneous combustion, then is achieved. Thus, by this manner we get from this mixture the explosive energy to drive approximately one hundred fifty or even two hundred i.e. 150–200 percent explosive energy for useful driving energy.

Referring once again to FIG. 1 there is shown the high pressure fuel-feeder valve mechanism 16 governed as shown. This mechanism feeds in the combustion space of the cylinder-head 18, the high-pressure LP gas coming from gas auxiliary tank 24 precisely at the very moment when the condensing pressure in the combustion chamber is the greatest. The working procedure of this mechanism is as follows. Manually operable control-valve 14 controls coarsely amounts of high-pressure LP gas directed to cylinder 18. The gas flows into the housing of high pressure valve 14 through this valve to the spring loaded safety valve 21 and around cam disc 30 and through borehole 28 of the high pressure control valve 32 of the high pressure feeder valve mechanism 16. Cam disc 30 is linked as shown by rods 27 and 29 and suitable gearing to the crankshaft 40. Since the high pressure feeder-valve 32 is normally maintained in a closed condition by the preloaded valve-spring 34, this valve opens and closes a slight amount, i.e. approximately 0.2 mm in the preferred arrangement, (approximately two tenths of millimeter in height) only sufficient to permit enough gas to effectuate the explosion. This valved aperture is controlled or steered by the cam disc 30 according to the time and piston position necessary for ignition. It can be seen that cam disc only rocks back and forth a portion of an arc to open and close valve 32. At the same time the automatic valve 20 which is a safety-valve also because it reacts to any backfire created by the pressure of the explosion—is closed and sealed onto seat 36 thereby permitting continuous operation undisturbedly.

Intake valve and exhaust valve 31 are operated off the crankshaft as shown. The above-described principle of ignition is called "the governed self-ignition principle" particularly because my engine does not need electrical ignition utilizing spark plugs or the like. With my engine the highest efficiency can be obtained from internal explosion engines.

Initially upon starting the LP gas vapor pressure in the auxiliary tank 24 is raised by heating the gas with electrical heater filament 42 connected to electrical power source in the form of battery 44 (and generator or alternator, not shown). After starting, the exhaust gases from the exhaust pipe pass through the hollow walls of the auxiliary tank 24 and thus raise the temperature in the tank. At this time, thermocouple 40 disconnects electrical heater filament 42, leaving the preheating and pressuring of LP gas 46 exclusively to the exhaust gases of the engine. In the event the temperature of auxiliary tank 24 is raised to excessive levels by engine exhaust gases, a suitable butterfly valve located in pipe 41 is connected to block the flow of exhaust gases in response to a temperature reading through a thermocouple located at 43 in auxiliary tank 24. Gas compressor 22 is required to compress LP gas so that the gas is in vapor form when it enters valve mechanism 16.

In the embodiment of FIG. 1 the high pressure valve assembly 16 is operable by linkage arms connected through appropriate gearing to crankshaft 48 as shown. However, other means of operating the high pressure valve mechanism can be used as for example, the system illustrated in FIG. 2 wherein crankshaft 48 is geared and connected to electrically powered circuitry which is arranged to actuate solenoid 50 which is linked to cam 52 which rocks sufficient to open valve 32 in governed sequence when the piston 54 is at top dead center, i.e.

precisely when firing is required to take place. Solenoid 50 is spring loaded toward the "valve closed" position by a spring 51 as shown. When fuel is to be introduced into the combustion space to provide the necessary balance of fuel required for combustion, solenoid 50 moves to the "valve open" position by a signal representative of the crankshaft position to permit the entry of fuel into the cylinder. Thereafter, the solenoid is signalled to permit spring 56 to return the valve 32 to the closed position.

Figure 2:
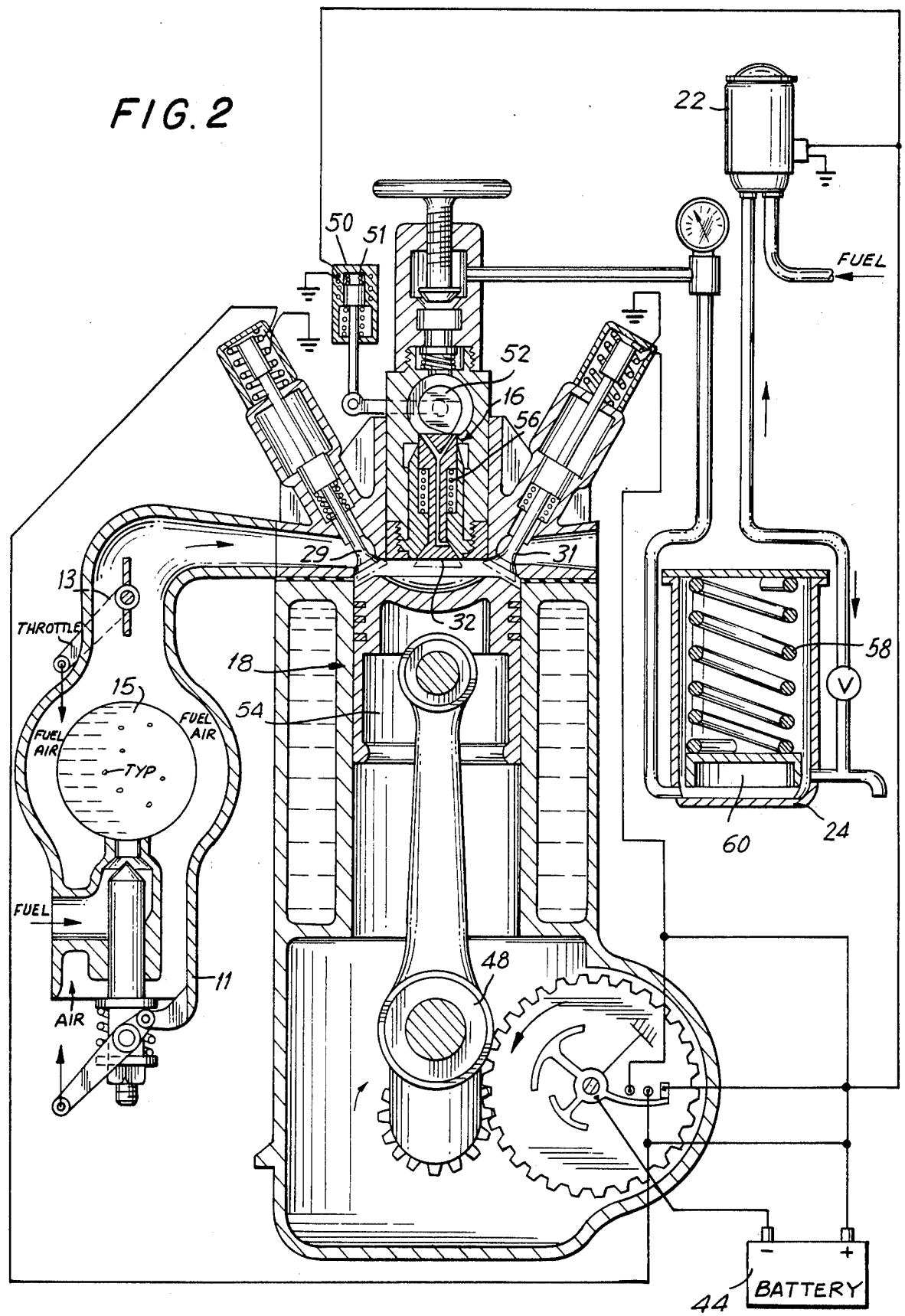
FIG. 2 is a cross-sectional view of an alternate embodiment of an engine constructed according to the invention.

Referring further to FIG. 2, pressure elevation is achieved in auxiliary fuel tank 24 by means of a spring 58 connected to plate 60 which acts as a pressurizing diaphragm. Fuel is delivered to the tank of this embodiment by compressor pump 2 as in FIG. 1, with the addition of a one way cutoff safety fuel valve 60. This embodiment of auxiliary fuel tank 24 is intended for use with fuels capable of being pressurized and vaporized independent of the temperature, i.e. gasoline, kerosene etc.

As can be seen in FIG. 2, fuel intake and exhaust valves 29 and 31 respectively are operable by solenoids linked and connected to operate in timed sequence with piston position through the position and electrical circuitry connected and geared to crankshaft 48.

In summary the basic principles of operation of both the embodiments of FIG. 1 and FIG. 2 are the same. The fuel may be any suitable fuel such as LP gas, natural gas, gasoline, kerosene etc. The fuel selected determines the type of auxiliary tank to use to develop pressure vapor of the high pressure auxiliary fuel supply. Fuel is mixed in the main carburetor 11 by suitable needle valve means, apertured ball 15, throttle control 13, etc. in a known manner to a level of approximately 10 percent fuel/air ratio, in predetermined amounts insufficient to support combustion. This fuel/air supply is at low pressure. Preferably, when piston 34 is at top dead center, the high pressure valve mechanism 16 and gearing as described hereinabove, permit high pressure preheated vaporized fuel to be introduced into the combustion space in sufficient quantity to raise the fuel/air ratio therein to the level required for combustion, i.e. about 16.5 percent, causing instantaneous or almost instantaneous spontaneous combustion. By this system spark plugs are eliminated and the need for timing advance is eliminated by virtue of the fact the burning takes place almost instantaneously whereas in prior art engines, fuel at low pressure and temperature required more time to complete burning, which was the reason for advancing the spark from the spark plug. This system also resulted in incomplete burning of the fuel.

By the present engine efficiency in terms of power output per unit of fuel, is increased substantially. Approximately 80-85 percent of the fuel introduced into the engine is actually burned to supply power, particularly due to the high compression ratio in combination with the principles described hereinabove.

It should be understood that any combination of the elements of FIG. 1 and the elements of FIG. 2 may be incorporated into a single engine without departing from the scope of my invention. For example solenoid operated intake and exhaust valves can be combined with the engine of FIG. 1, or for example, the auxiliary tank of FIG. 2 can be combined with the engine of FIG. 1 provde the correct fuel is used.

I claim:

1. An internal combustion engine operable on a fuel capable of being atomized at pressures above atmospheric pressure, which comprises:
   (a) at least one piston and cylinder defining an internal combustion chamber of compression ratio sufficient to provide self-ignition with said fuel when mixed therein with air;
   (b) intake means selectively communicating a first source of said fuel with said internal combustion chamber and operable in timed relation to piston stroke and position;
   (c) exhaust means operable in timed relation to piston position to selectively permit combusted gases to exit the cylinder;
   (d) means for selectively mixing fuel from said first fuel supply with air at relatively low pressure and for permitting said mixture to be introduced into said cylinder through said intake means during the intake stroke of the piston, the fuel/air ratio being less than the ratio required for self-ignition when the piston is at or near the top of the compression stroke;
   (e) auxiliary fuel supply means maintained at a predetermined elevated pressure, the pressure being greater than the pressure within the combustion chamber when the piston is at or near top dead center; and
   (f) valve means selectively opened and closed by means operatively linked to the crankshaft for selectively communicating said auxiliary fuel supply means with said combustion chamber and for selectively permitting a predetermined heated amount of said fuel under pressure to be introduced from said auxiliary fuel supply means into said combustion chamber in timed sequence such that when said piston is at a predetermined position at or near the top of the compression stroke of said piston, a predetermined amount of auxiliary fuel is permitted to be introduced into said combustion chamber sufficient to raise the fuel/air ratio therein to a level sufficient to cause governed self-ignition within said combustion chamber at the temperature caused by the compression of said first supply of fuel and air therein, whereby said first fuel and air mixture and said auxiliary pressurized and heated fuel supply results in substantial burning efficiency of the fuel therein thereby resulting in substantially improved efficiency of the energy output of said engine.

2. The engine according to claim 1 wherein said auxiliary fuel supply is separately preheated during starting to elevate the pressure thereof, and subsequently heated by exhaust gases, prior to introduction to said combustion chamber by fuel needle valve and cam operated intake valve or fuel injection means.

3. The engine according to claim 2 wherein said auxiliary fuel supply is separately preheated during starting by means of an electrically heated element.

4. The engine according to claim 3 wherein said high pressure auxiliary fuel supply is introduced to said combustion chamber at a temperature sufficient to maintain said elevated pressure, and auxiliary fuel intake means is provided for introducing said auxiliary fuel into said chamber, the operation of said auxiliary fuel intake means being governed according to the stroke and position of the piston within the cylinder.

5. The engine according to claim 4 wherein said auxiliary fuel supply is heated sufficiently so as to raise the pressure of the auxiliary fuel to a level greater than the pressure of the fuel/air mixture in the combustion chamber of the cylinder when the piston is at or near the top of its compression stroke.

6. The engine according to claim 5 wherein fuel in the form of liquid petroleum gas (LPG) from said first fuel supply is mixed with air in an intake conduit pipe communicating with the intake means of the engine, and said auxiliary fuel supply is LPG heated to develop pressure, said intake manifold communicating with throttle means having fuel feeder valve means either manually controlled or automatically governed according to the stroke and position of the piston within the cylinder.

7. The engine according to claim 5 wherein fuel in the form of gasoline or the like from said first fuel supply is mixed with air in an intake conduit pipe communicating with the intake manifold of the engine, and said auxiliary fuel supply is gasoline heated and maintained under pressure, said intake manifold communicating with throttle means having fuel feeder valve means either manually controlled or automatically governed according to the stroke and position of the piston within the cylinder.

8. The engine according to claim 7 wherein said auxiliary fuel supply is maintained under pressure by spring means.

9. The engine according to claim 5 wherein fuel in the form of kerosene or the like from said first fuel supply is mixed with air in an intake conduit pipe communicating with the intake manifold of the engine, and said auxiliary fuel supply is kerosene heated and maintained under pressure, said intake manifold communicating with throttle means having fuel feeder valve means either manually controlled or automatically governed according to the stroke and position of the piston within the cylinder.

10. The engine according to claim 9 wherein said auxiliary fuel supply is maintained under pressure by spring means.

11. The engine according to claim 1 further comprising a crankshaft connected to said piston to deliver power output from said piston.

12. The engine according to claim 6 wherein said valve means for selectively communicating said auxiliary fuel supply means with said combustion chamber is a high pressure valve mechanism positioned at the upper part of said combustion chamber and operable by cam means connected by linkages to open and close in timed relation to the rotational position of said crankshaft.

13. The engine according to claim 7 wherein said valve means for selectively communicating said auxiliary fuel supply means with said combustion chamber is a high pressure valve positioned at the upper part of said combustion chamber and operable by cam means connected by linkages and operable between valve open and valve closed positions in timed relation to the rotational position of said crank shaft.

14. The engine according to claim 9 wherein said valve means for selectively communicating said auxiliary fuel supply means with said combustion chamber is a high pressure valve positioned at the upper part of said combustion chamber and operable by cam means connected by linkages and operable between valve open and valve closed positions in timed relation to the rotational position of said crank shaft.

15. The engine according to claim 6 further comprising more than one cylinder and associated pistons, each defining respective combustion chambers and each communicating with a fuel/air intake manifold and said auxiliary pressurized fuel supply.

16. The engine according to claim 7 further comprising more than one cylinder and associated pistons, each defining respective combustion chambers and each communicating with a fuel/air intake manifold and said auxiliary pressurized fuel supply.

17. The engine according to claim 9 further comprising more than one cylinder and associated pistons, each defining respective combustion chambers and each communicating with a fuel/air intake manifold and said auxiliary pressurized fuel supply.

18. An internal combustion engine operable on a fuel capable of being atomized at pressures above atmospheric pressure, which comprises:
(a) at least one piston and cylinder defining an internal combustion chamber of compression ratio sufficient to provide self-ignition with said fuel when mixed therein with air;
(b) intake means selectively communicating a first source of said fuel with said internal combustion chamber and operable in timed relation to piston stroke and position;
(c) exhaust means operable in timed relation to piston position to selectively permit combusted gases to exit the cylinder;
(d) means for selectively mixing fuel from said first fuel supply with air at relatively low pressure and for permitting said mixture to be introduced into said cylinder through said intake means during the intake stroke of the piston, the fuel/air ratio being less than the ratio required for self-ignition when the piston is at or near the top of the compression stroke;
(e) an auxiliary fuel supply tank with means for supplying fuel therein, the fuel being maintained at a predetermined elevated pressure greater than the pressure within the combustion chamber when the piston is at or near top dead center; and
(f) a fuel intake valve at top dead center of said cylinder, said valve being selectively opened and closed by cam means linked to the crank shaft, for selectively introducing auxiliary heated fuel into said combustion chamber fuel under pressure from said auxiliary fuel tank in timed sequence such that when said piston is at a predetermined position at or near the top of the compression stroke of said piston, a predetermined heated amount of auxiliary fuel is permitted to be introduced into said combustion chamber sufficient to raise the fuel/air ratio therein to a level sufficient to cause governed self-ignition within said combustion chamber at the temperature caused by the compression of said first supply of fuel and air therein, whereby said first fuel and air mixture and said auxiliary pressurized and heated fuel supply results in substantial burning efficiency of the fuel therein thereby resulting in substantially improved efficiency of the energy output of said engine.

19. An internal combustion engine operable on a fuel capable of being atomized at pressures above atmospheric pressure, which comprises:
(a) at least one piston and cylinder defining an internal combustion chamber of compression ratio sufficient to provide self-ignition with said fuel when mixed therein with air;
(b) intake means selectively communicating a first source of said fuel with said internal combustion chamber and operable in timed relation to piston stroke and position;

(c) exhaust means operable in timed relation to piston position to selectively permit combusted gases to exit the cylinder;

(d) means for selectively mixing fuel from said first fuel supply with air at relatively low pressure and for permitting said mixture to be introduced into said cylinder through said intake means during the intake stroke of the piston, the fuel/air ratio being less than the ratio required for self-ignition when the piston is at or near the top of the compression stroke;

(e) an auxiliary fuel supply tank with means for supplying fuel therein the fuel being maintained under predetermined elevated pressure, the pressure being greater than the pressure within the combustion chamber when the piston is at or near top dead center; and (f) a fuel intake valve at top dead center of said cylinder, said valve being selectively opened and closed by solonoid means operatively linked to the crankshaft for selectively introducing auxiliary heated fuel into said combustion chamber under pressure from said auxiliary fuel tank in timed sequence such that when said piston is at a predetermined position at or near the top of the compression stroke of said piston, a predetermined amount of auxiliary fuel is permitted to be introduced into said combustion chamber sufficient to raise the fuel/air ratio therein to a level sufficient to cause governed self-ignition within said combustion chamber at the temperature caused by the compression of said first supply of fuel and air therein, whereby said first fuel and air mixture and said auxiliary heated and pressurized fuel supply results in substantial burning efficiency of the fuel therein thereby resulting in substantially improved efficiency of the energy output of said engine.

* * * * *